(12) United States Patent
Kim

(10) Patent No.: US 9,976,449 B2
(45) Date of Patent: May 22, 2018

(54) METHOD AND APPARATUS FOR CONTROLLING CVVT ENGINE OF INTERMEDIATE PHASE

(71) Applicants: Hyundai Motor Company, Seoul (KR); Kia Motors Corp., Seoul (KR)

(72) Inventor: Hyun Kim, Hwaseong-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 793 days.

(21) Appl. No.: 14/541,066

(22) Filed: Nov. 13, 2014

(65) Prior Publication Data

US 2016/0003109 A1  Jan. 7, 2016

(30) Foreign Application Priority Data

Jul. 7, 2014 (KR) ........................ 10-2014-0084699

(51) Int. Cl.
| | | |
|---|---|---|
| F01L 1/34 | (2006.01) |
| B60W 20/00 | (2016.01) |
| B60W 10/06 | (2006.01) |
| F01L 1/344 | (2006.01) |

(52) U.S. Cl.
CPC ........... *F01L 1/3442* (2013.01); *B60W 10/06* (2013.01); *B60W 20/00* (2013.01); *F01L 1/344* (2013.01); *F01L 2001/3443* (2013.01); *F01L 2001/34423* (2013.01); *F01L 2001/34426* (2013.01); *F01L 2800/00* (2013.01)

(58) Field of Classification Search
USPC .... 123/497, 500, 501, 503, 504, 508, 90.15, 123/90.17
See application file for complete search history.

(56) References Cited

U.S. PATENT DOCUMENTS

2003/0066501 A1* 4/2003 Park ...................... F01L 1/3442
123/90.17

FOREIGN PATENT DOCUMENTS

| | | |
|---|---|---|
| JP | 09-026021 A | 1/1997 |
| JP | 2001-248719 A | 9/2001 |
| JP | 2001-330118 A | 11/2001 |
| JP | 2002-206631 A | 7/2002 |
| JP | 2010-270701 A | 12/2010 |
| KR | 10-2003-0030203 A | 4/2003 |
| KR | 10-2004-0049076 A | 6/2004 |
| KR | 10-0779843 B1 | 11/2007 |

* cited by examiner

*Primary Examiner* — Mark Laurenzi
*Assistant Examiner* — Wesley Harris
(74) *Attorney, Agent, or Firm* — Morgan, Lewis & Bockius LLP

(57) ABSTRACT

A method and an apparatus for controlling a CVVT engine of an intermediate phase may include amending a fixed PWM frequency that is applied to a plunger when a temperature of oil passing through oil fluid passages is a set value or less by a controller so that a stroke value of the plunger can be increased.

5 Claims, 4 Drawing Sheets

METHOD AND APPARATUS FOR CONTROLLING CVVT ENGINE OF INTERMEDIATE PHASE

CROSS-REFERENCE TO RELATED APPLICATION

The present application claims priority to Korean Patent Application Number 10-2014-0084699 filed Jul. 7, 2014, the entire contents of which is incorporated herein for all purposes by this reference.

BACKGROUND OF THE INVENTION

Field of the Invention

The present invention relates to a method and an apparatus for controlling a CVVT engine of an intermediate phase, and more particularly, to a method and an apparatus for controlling a CVVT engine of an intermediate phase in which operational properties of a plunger in low-temperature regions are improved.

Description of Related Art

Generally, an internal combustion engine is a device for generating power by inhaling air and fuel from an outside thereof and burning them in a combustion room and is provided with intake valves for inhaling air and fuel into the combustion room and exhaust valves for discharging explosion gas that is exploded in the combustion room.

The intake valve and exhaust valve as described above are opened and closed depending on the rotation of a cam shaft that rotates in link with a crank shaft, in which the optimum opening and closing times of the intake valve and exhaust valve may be varied depending on the rotation number of an engine, loads thereon and the like.

In order to determine the optimum opening and closing time of the intake valve and exhaust valve, a device has been developed to properly control the opening and closing time of the valves in accordance with a driving situation of an engine by allowing the cam shaft to be displaced within a set range without determining whether the cam shaft is rotated by only the rotation of the crank shaft, which refers to VVT (Variable Valve Timing).

A Continuous Variable Valve Timing (hereinafter referred to as "CVVT") is a kind of this VVT, and is has a configuration to control the valve timing to a random value within a set range.

The CVVT system has such advantages that the opening and closing time of the valves is controlled depending on rotation numbers of an engine and thereby improves fuel efficiency, reduces the amount of discharging gas, increases torque at a low speed, and improves output.

That is, a pumping loss is reduced by increasing valve overlaps between the intake valve and exhaust valve and thereby improves fuel efficiency, the amount of discharging gas is reduced by optimizing the valve overlaps depending on an engine condition and re-burning non-burnt gas through internal EGR (Engine Gas Recirculation), and the torque at a low speed and output of the engine are improved by optimizing the intake valve timing depending on the engine condition and increasing volume efficiency.

Recently, the CVVT system of an intermediate phase, which has improved the problems regarding response property and operational region limitation of an existing CVVT system, has been actively developed.

In the CVVT of an intermediate phase, the position of a cam is controlled at an intermediate location, not at maximum retard (intake) and at maximum advance (exhaust), and thus the response property is prompt and the utilizing region of the cam is widened, thereby improving fuel efficiency and reducing the amount of the discharging gas.

The CVVT system of an intermediate phase has been actively developed in the field of new engine, however, there are complicated internal fluid passages and precise control of Oil Control Valve (OCV) is required.

In the CVVT system of an intermediate phase, a plunger which is controlled by DUTY value of Pulse Width Modulation (PWM) as an electric signal controls a cam by controlling the fluid passage while the plunger moves.

As described above, the CVVT system of an intermediate phase controls a CVVT using not only oil force but also cam torque so that the CVVT can be controlled at a low temperature where oil pressure is low while a vehicle starts-on. However, in a case where an engine is at a low temperature, the oil pressure is low and also mechanical friction of components of the engine is increased so that the control for fuel efficiency, performance, and decreasing of the amount of discharging gas is required for operating the CVVT.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing present a method and an apparatus for controlling a CVVT engine of an intermediate phase in which operational properties of a plunger at a low temperature are improved by amending a fixed frequency applied to the plunger depending on the temperature in low-temperature regions.

According to various aspects of the present invention, a method of controlling a CVVT engine of the intermediate phase may include amending a fixed PWM frequency that is applied to a plunger when a temperature of oil passing through oil fluid passages is a set value or less by a controller so that a stroke value of the plunger can be increased.

The fixed PWM frequency may be amended by reflecting a compensation frequency set depending on temperature to the fixed PWM frequency that is applied to the plunger.

A final frequency that is applied to the plunger may be smaller than the fixed PWM frequency.

The method of controlling the CVVT engine of the intermediate phase may further include applying a fixed PWM frequency; comparing temperature of the engine to a set temperature value, and applying an amended value to the plunger by reflecting a compensation frequency having different values depending on temperature to the fixed PWM frequency when the temperature of the engine is a set temperature value or less.

The temperature of the engine may be reflected by measuring any one or more of temperature of cooling water or intake air.

When the temperature of the engine may exceed the set temperature value, only a fixed PWM frequency except for the compensation frequency is applied to the plunger.

According to various aspects of the present invention, an apparatus for controlling a CVVT engine of an intermediate phase may include a plunger, and a controller for applying a fixed PWM frequency to the plunger by comparing a temperature of the engine to a set temperature value and reflecting a compensation frequency to the fixed PWM frequency when the temperature of the engine is the set temperature value or less.

A frequency that is applied to the plunger by the controller may have values smaller than the fixed PWM frequency.

The temperature of the engine may be reflected by measuring any one or more of temperature of cooling water or intake air, and when the temperature of the engine exceeds the set temperature value, only a fixed PWM frequency except for the compensation frequency may be applied to the plunger.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The CVVT system of an intermediate phase is a system for controlling the amount of oil to be supplied to an advance chamber and a retard chamber by controlling locations of a plunger with an electric signal applied to the plunger.

The prompt response and following properties can be obtained when the amount of oil is controlled by the CVVT system of an intermediate phase in which precise control of oil fluid passages is required and for this purpose precise control of the location of a plunger is needed.

Further, the CVVT system of an intermediate system can be controlled by not only oil but also cam torque so that it can be operable at the point when an engine starts-on, that is, even in low-temperature regions where oil pressure is low, however, it has a problem that in a case where an engine is at a low temperature, the oil pressure is low and also mechanical frictions between components consisting of the engine are increased.

Especially, a plunder that is operated by receiving electric signals is generally operated with fixed frequency values applied thereto, and therefore is controlled by varying PWM DUTY value.

As described above, the friction force of the plunger in low-temperature regions is increased depending on physical property and thus relatively greater force than that in a warm-up state is necessary for operating the plunger. However, since the voltage of a battery as electric energy source is low in low-temperature regions, it is difficult to smoothly operate the plunger.

According to various embodiments of the present invention, PWM frequency that is applied to the plunger is compensated so as to be able to smoothly control the plunger by minimizing friction when the plunger is operated at a low temperature.

Figure 1:
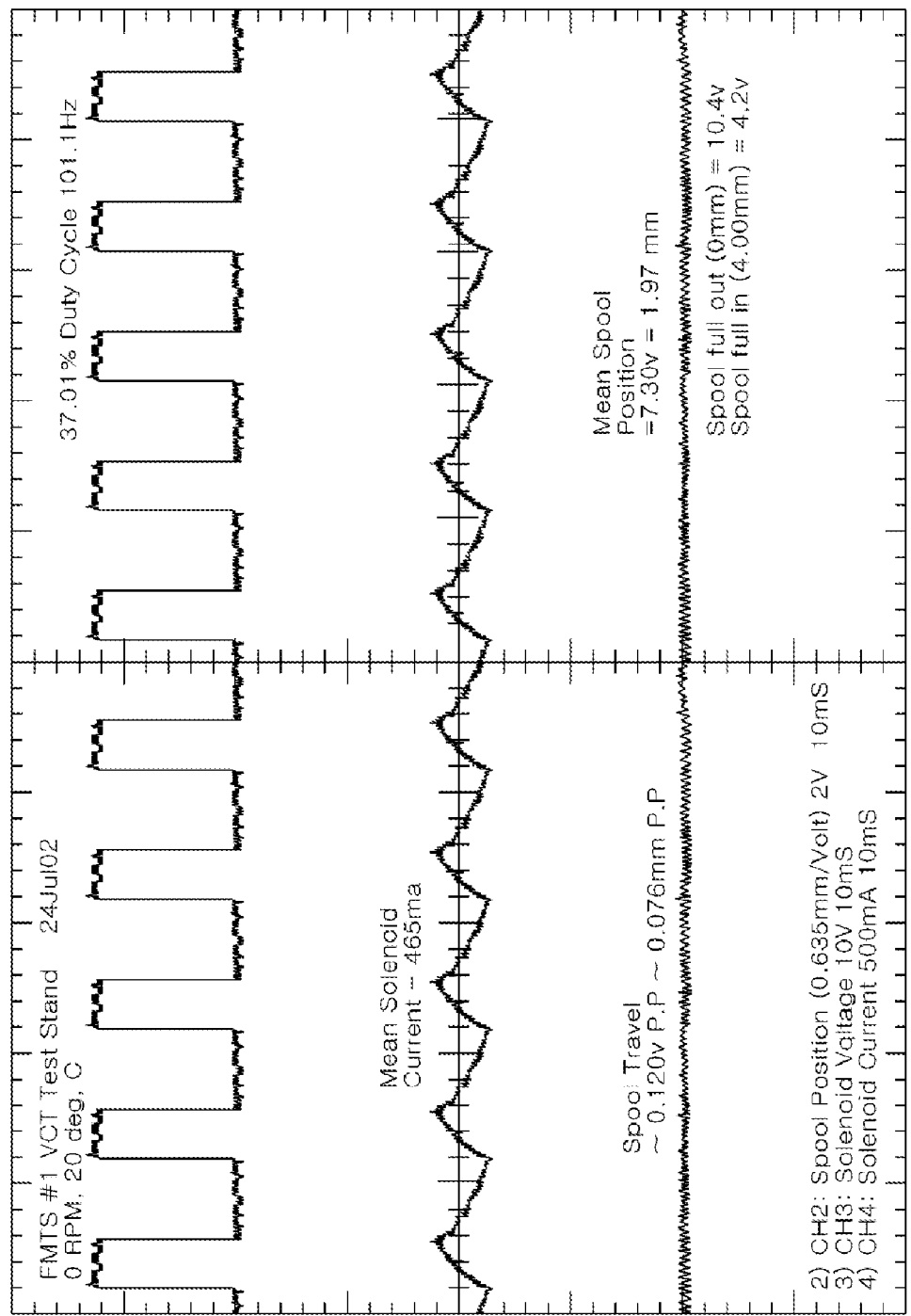
FIG. 1 is a graph illustrating movements of a plunger when a frequency of 100 Hz is applied to the plunger according to an exemplary method for controlling a CVVT engine of an intermediate phase of the present invention.
Figure 2:
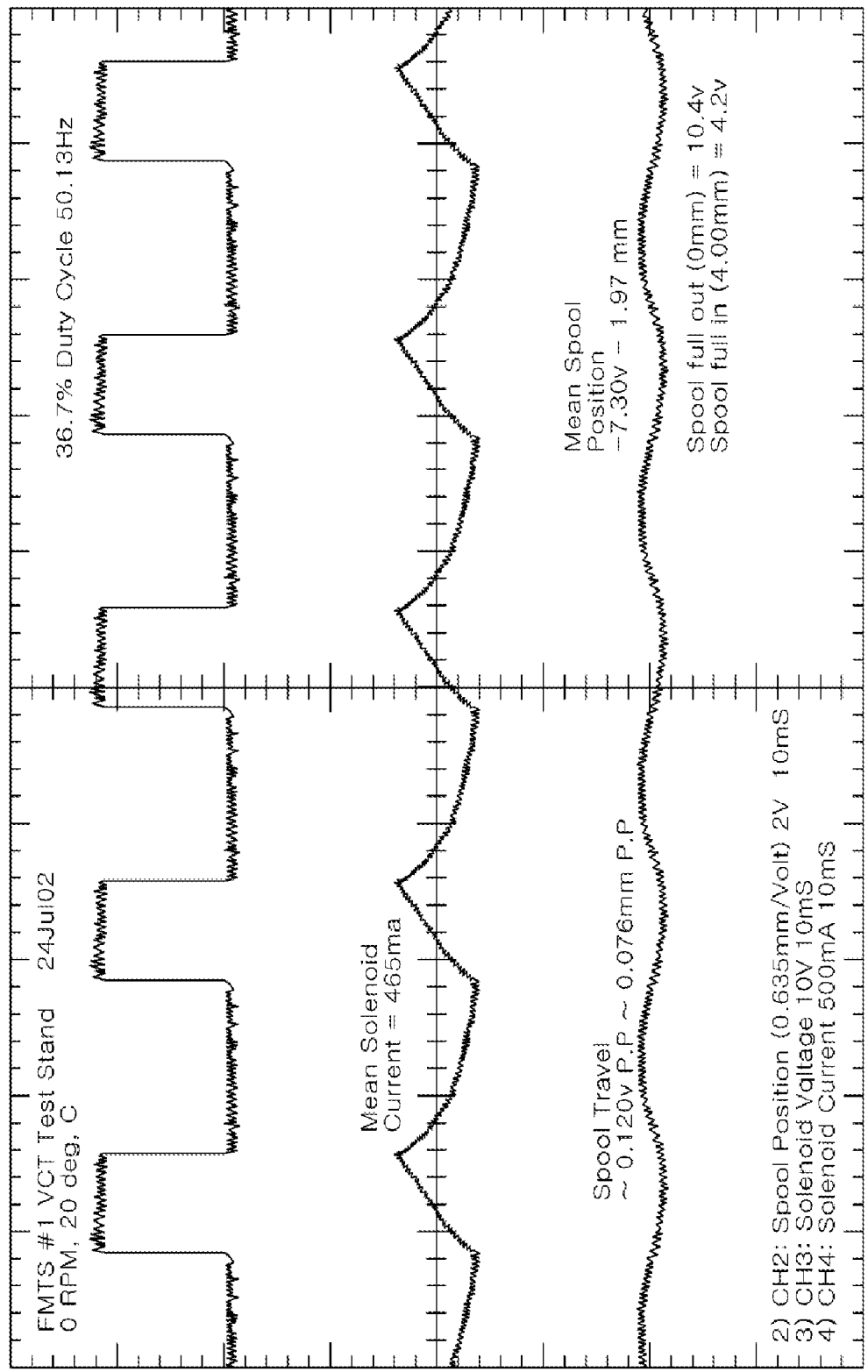
FIG. 2 is a graph illustrating movements of the plunger when a frequency of 50 Hz is applied to the plunger according to the exemplary method for controlling the CVVT engine of the intermediate phase of the present invention.
Figure 3:
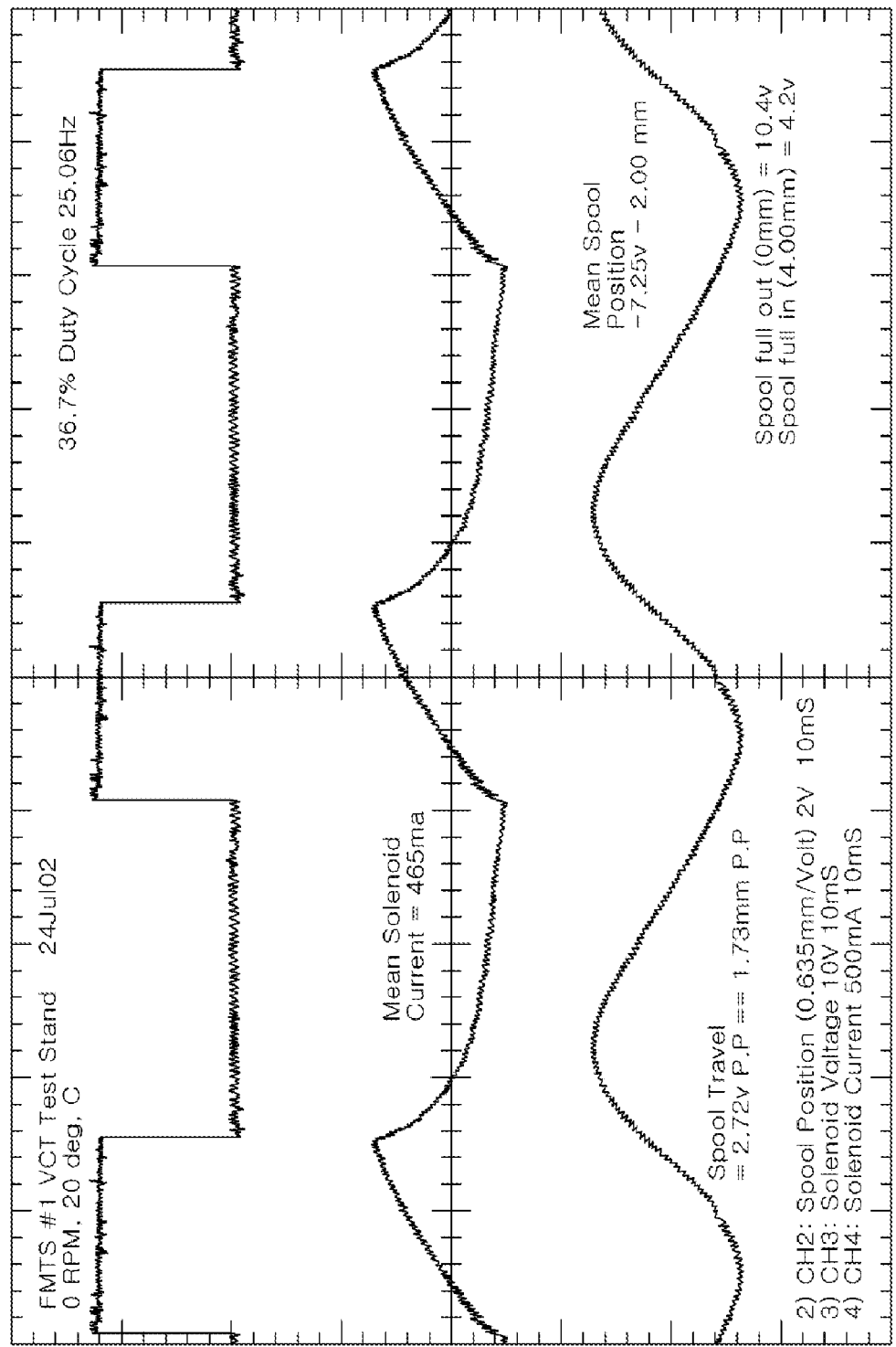
FIG. 3 is a graph illustrating movements of the plunger when a frequency of 25 Hz is applied to the plunger according to the exemplary method for controlling the CVVT engine of the intermediate phase of the present invention.

As shown in FIGS. 1 to 3, reviewing the test result obtained by varying the frequency applied to a plunger, it can be shown that the movement of the plunger is changed depending on the frequency, wherein as the frequency that is applied to the plunger is lowered, the stroke value of the plunger increases so that the movement of the plunger is improved when it is controlled. That is, the stroke value of the plunger increases under conditions of low temperature thereby to overcome an initial friction force that is generated when the plunger moves and allow the plunger to smoothly move.

As shown in FIG. 1, in a case of varying PWM DUTY value at a fixed frequency of 100 Hz, it can be observed that the stroke value of a plunger is not almost varied.

As shown in FIG. 2, it can be shown that when a frequency of 50 Hz, by lowering a frequency value, is applied to a plunger, the plunger slightly moves and the movement frequency of the plunger per unit time increases, but the stroke value is not so great.

As shown in FIG. 3, it can be shown that when controlling PWM DUTY value while varying it at a 25 Hz, the stroke value of a plunger increases and thus the movement of the plunger is improved even at a low temperature.

That is, a plunger is given minute movements by varying PWM DUTY value and thus static friction force applied at an initial operation of the plunger is minimized, thereby smoothing the initial movement of the plunger.

Figure 4:
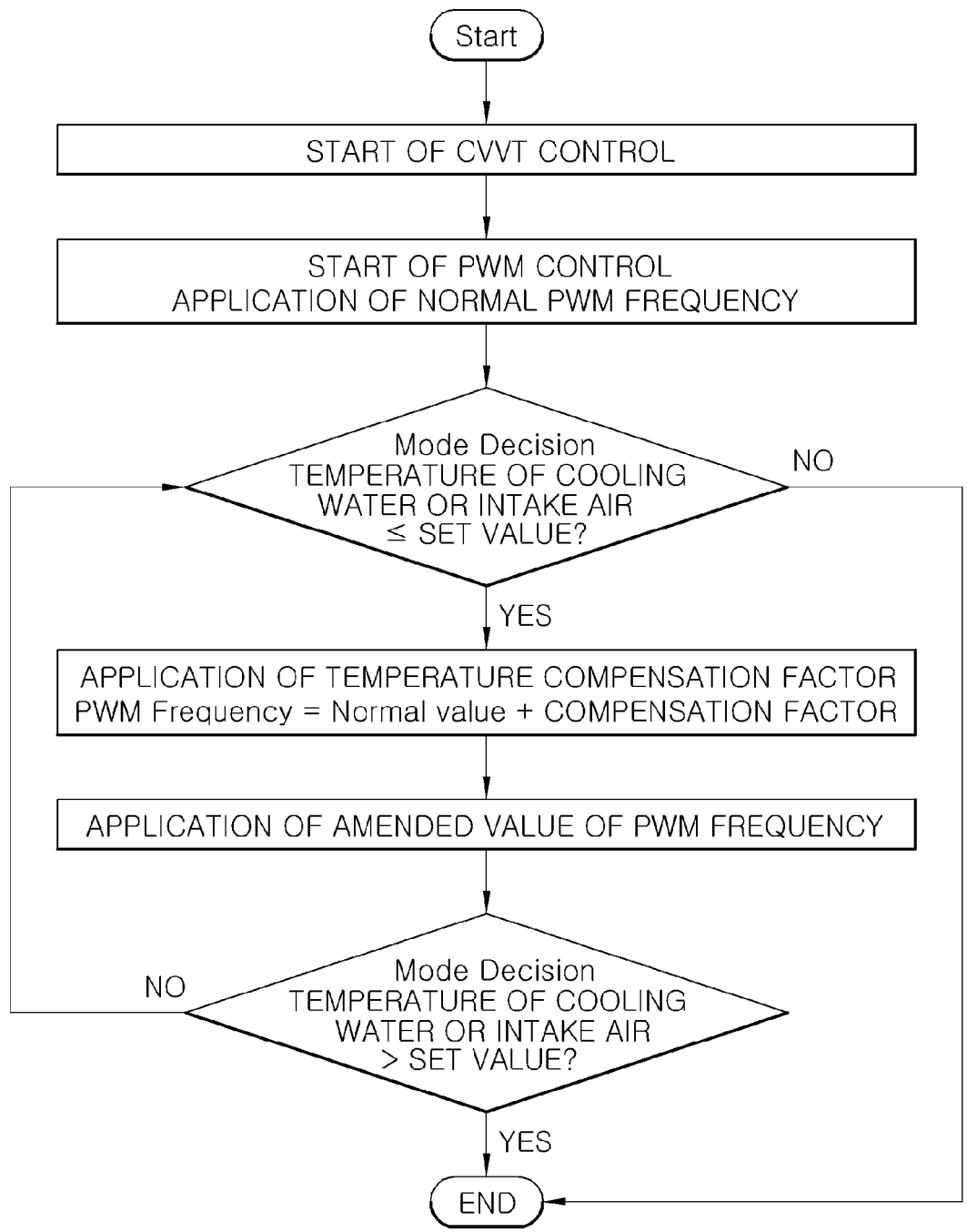
FIG. 4 is a flow chart illustrating the exemplary method for controlling the CVVT engine of the intermediate phase of the present invention.

As shown in FIG. 4, a method of controlling a CVVT engine of an intermediate phase according to various embodiments of the present invention is started from a process of applying a fixed frequency to a plunger.

An electric signal is applied to a plunger so as to control oil fluid passages in a CVVT system. Even though PWM frequency of a fixed value is commonly applied to a plunger, the PWM frequency that is fixed in low-temperature areas is compensated depending on temperature values in the present invention, thereby minimizing static friction force in low-temperature regions. That is, the operational property of a plunger in low-temperature regions is improved by minutely operating the plunger to be stroked in the forward and rearward directions.

Here, whether it belongs to low-temperature regions may be preferably determined by measured value of temperature of cooling water or intake air, wherein it is determined not to be in low-temperature regions when the measured value exceeds a preset value and it is determined to be in low-temperature regions when the measured value is a preset value or less.

If it is determined not to be in low-temperature regions, an existing fixed frequency is applied to a plunger as it is, and if it is determined to be in low-temperature regions, the fixed frequency is to be varied by applying a compensation factor depending on temperature.

The frequency compensation is continuously made until a temperature condition reaches a set value, and when an engine is warmed-up sufficiently to reach the set value, the frequency compensation is not needed further and thus the fixed PWM frequency is applied to a plunger.

According to various embodiments of the present invention, the frequency that is finally applied to a plunger is compensated to a frequency value smaller than a fixed PWM frequency by applying a compensation factor depending on temperature to the fixed PWM frequency in low-temperature regions, wherein it intends to minutely move the plunger by lowering the frequency to be applied to the plunger.

An apparatus for controlling a CVVT engine of an intermediate phase according to various embodiments of the present invention may include a plunger and a controller, wherein the controller controls the movement of the plunger.

Here, a fixed PWM frequency that is applied to a plunger, a set value for determining whether current state is in low-temperature regions, and a compensation frequency value corresponding to a compensation factor depending on temperature are stored in the controller.

Accordingly, when a temperature of cooling water or intake air is measured by various sensors and measured values are transmitted to the controller, the controller compares the measured values to a reference temperature value. At this time, when an actual measured value does not reach a reference temperature value, it is determined as a low-temperature state and a final frequency value is applied to a plunger by reflecting a compensation frequency to a fixed frequency.

As a result, the friction force generated when a plunger is operated in low-temperature regions is minimized, thereby improving fuel efficiency and performance and reducing the amount of discharging gas.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a Continuous Variable Valve Timing (CVVT) engine of an intermediate phase, comprising:
    amending a fixed Pulse Width Modulation (PWM) frequency that is applied to a plunger when a temperature of oil passing through oil fluid passages is a set value or less by a controller so that a stroke value of the plunger is increased,
    wherein the stroke value of the plunger is a travel distance of the plunger which controls the oil fluid passages.

2. The method of controlling the CVVT engine of the intermediate phase of claim 1, wherein the fixed PWM frequency is amended by reflecting a compensation frequency set depending on temperature to the fixed PWM frequency that is applied to the plunger.

3. The method of controlling the CVVT engine of the intermediate phase of claim 2, wherein a final frequency that is applied to the plunger is smaller than the fixed PWM frequency.

4. An apparatus for controlling a Continuous Variable Valve Timing (CVVT) engine of an intermediate phase, comprising:
    a plunger; and
    a controller for applying a fixed Pulse Width Modulation (PWM) frequency to the plunger by comparing a temperature of the engine to a set temperature value and reflecting a compensation frequency to the fixed PWM frequency when the temperature of the engine is the set temperature value or less,
    wherein the temperature of the engine is reflected by measuring any one or more of temperature of cooling water or intake air and when the temperature of the engine exceeds the set temperature value, only the fixed PWM frequency except for the compensation frequency is applied to the plunger.

5. The apparatus for controlling the CVVT engine of the intermediate phase of claim 4, wherein a frequency that is applied to the plunger by the controller has values smaller than the fixed PWM frequency.

* * * * *